US011019537B2

(12) United States Patent
Chiang et al.

(10) Patent No.: US 11,019,537 B2
(45) Date of Patent: May 25, 2021

(54) FALLBACK MECHANISM FOR FAILED FIFTH GENERATION (5G) COMMUNICATION SET-UP

(71) Applicant: T-Mobile USA, Inc., Bellevue, WA (US)

(72) Inventors: Hsin-Fu Henry Chiang, Bellevue, WA (US); Christopher H. Joul, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 23 days.

(21) Appl. No.: 16/452,146

(22) Filed: Jun. 25, 2019

(65) Prior Publication Data

US 2020/0413297 A1  Dec. 31, 2020

(51) Int. Cl.
*H04W 36/00* (2009.01)
*H04W 36/14* (2009.01)
*H04W 84/04* (2009.01)

(52) U.S. Cl.
CPC ....... *H04W 36/0022* (2013.01); *H04W 36/14* (2013.01); *H04W 84/042* (2013.01)

(58) Field of Classification Search
CPC .......... H04W 36/0022; H04W 36/14; H04W 84/042
USPC ................ 370/310, 328, 329, 331
See application file for complete search history.

(56) References Cited

U.S. PATENT DOCUMENTS

| 2015/0079948 A1 | 3/2015 | May-Weymann et al. |
| 2019/0149583 A1* | 5/2019 | Jutila ................. H04L 65/1073 455/435.1 |
| 2019/0150039 A1* | 5/2019 | Raghunathan ...... H04W 36/305 370/331 |
| 2020/0170064 A1* | 5/2020 | Keller ................. H04L 65/1016 |

OTHER PUBLICATIONS

"3rd Generation Partnership Project; 1-15 Technical Specification Group Services and System Aspects; Procedures for the 5G System; Stage 2 (Release 16)", vol. SA WG2, No. VI6.I.I, 3GPP Standard; Technical Specification; 3GPP TS 23.502, 3rd Generation Partnership Project (3GPP), Jun. 11, 2019 (Jun. 11, 2019), pp. 1-495.
The Extended European Search Report dated Nov. 13, 2020 for European Patent Application No. 20177514.5, 11 pages.

(Continued)

*Primary Examiner* — Obaidul Huq
(74) *Attorney, Agent, or Firm* — Lee & Hayes, P.C.

(57) ABSTRACT

A fallback mechanism for managing voice over fifth generation (5G) communications is described. In an example, server computing device(s) associated with a 5G network can receive, from a mobile computing device, a request to initiate a voice call over the 5G network. The server computing device(s) can detect a failure to establish the voice call via the 5G network and responsive to detecting the failure to establish the voice call via the 5G network, the server computing device(s) can send, to the mobile computing device, an indication that the voice call failed. The indication can include an instruction to re-attempt to establish the voice call via a different network, and the instruction can cause the mobile computing device to re-attempt, in association with the request, to establish the voice call via the different network.

18 Claims, 7 Drawing Sheets

(56) References Cited

OTHER PUBLICATIONS

Qualcomm Incorporated, "Voice fallback indication", retrieved on Feb. 15, 2019 at <<http://www.3gpp.org/ftp/tsg%5Fran/WG2%5FRL2/TSGR2%5F105/Docs/R2%2D1900525%2Ezip>>, vol. RAN WG2, No. Feb. 25, 2019-Mar. 1, 2019, 3GPP Draft, 4 pages.

\* cited by examiner

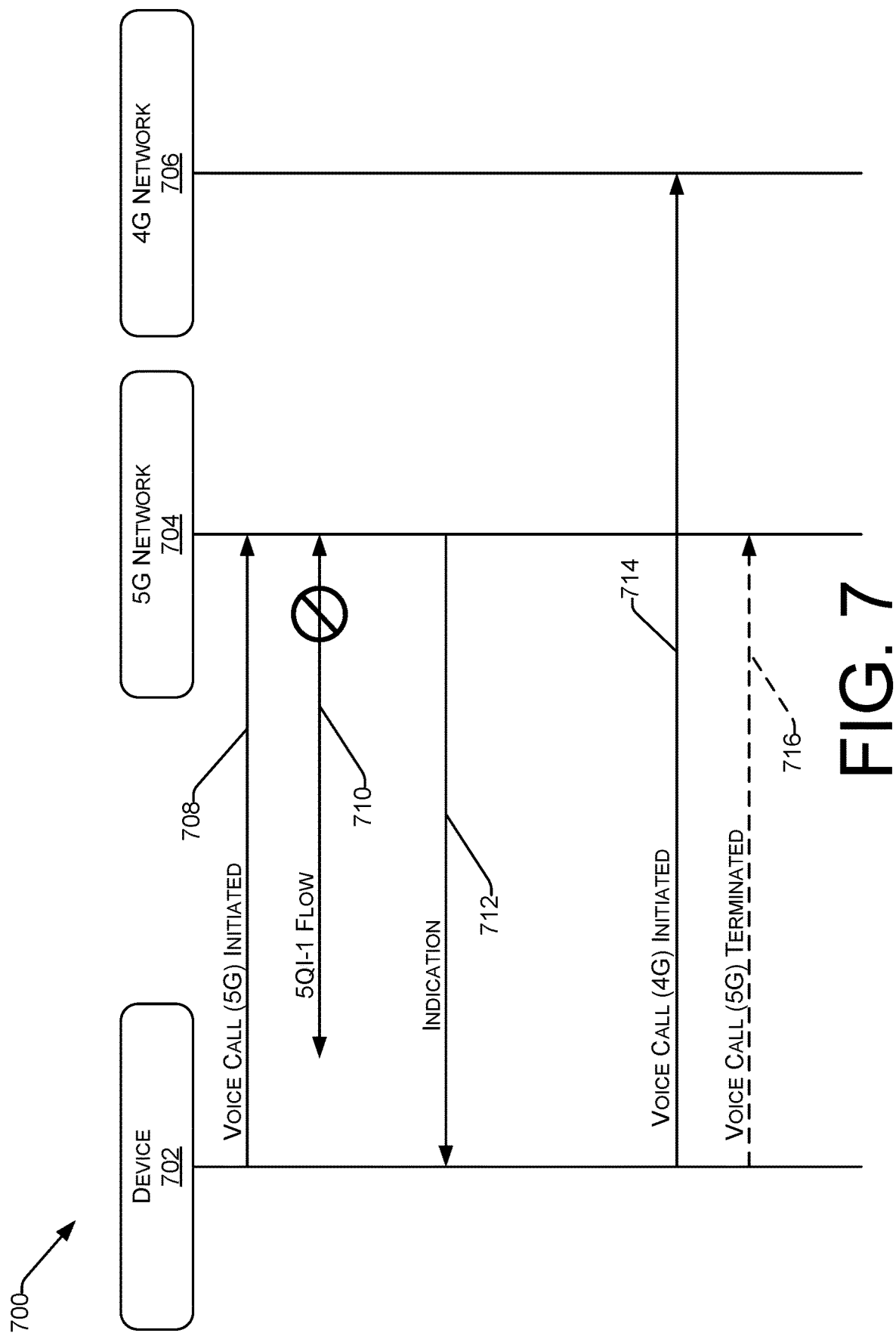

FALLBACK MECHANISM FOR FAILED FIFTH GENERATION (5G) COMMUNICATION SET-UP

BACKGROUND

Fourth generation (4G) radio access technology is an internet protocol (IP) based radio access technology with a capacity of 100 Megabits per second to 1 Gigabit per second. 4G technology delivers high quality, high speed, and high capacity (generally at low service costs). 4G technology is used for voice, multimedia, and internet over IP based data transmissions. Additional details associated with 4G technologies can be found in the International Mobile Telecommunications Advanced (IMT-Advanced) specification specified by the International Telecommunications Union-Radio (ITR-U). 4G technology is defined by the Long-Term Evolution (LTE) standard.

Fifth generation (5G) radio access technology is associated with the 5G New Radio (NR) standard. 5G technology has more capacity than 4G technology, supporting multiple (e.g., up to 35) Gigabits per second. 5G technology has the potential to deliver higher quality, higher speed, and higher capacity (at even lower costs) than 4G technology. Additionally, 5G technology has significantly lower latency than 4G technology, enabling faster load times. 5G technology can support voice, multimedia, and internet over IP based data transmissions, as well as supporting internet connected devices (Internet of Things (TOT)), autonomous vehicles, virtual and/or augmented reality advancements, and additional and/or alternative use cases.

When a mobile computing device attempts to establish a voice call using 5G technology, a dedicated Quality of Service (QoS) flow (i.e., 5QI-1 flow) is established to enable data to be exchanged between the mobile computing device and the 5G network. When this QoS flow cannot be established successfully, the user will have a poor experience (e.g., a mute-call, a dropped call, etc.). Additional details associated with this QoS flow are described in the 3GPP Technical Specifications 24.229, 23.501, 23.502, 24.501, and 24.502.

BRIEF DESCRIPTION OF THE DRAWINGS

FIG. 7 illustrates an example process for a fallback mechanism for failed 5G communication set-up, wherein a mobile computing device is not originating the 5G communication, as described herein.

DETAILED DESCRIPTION

Figure 1:
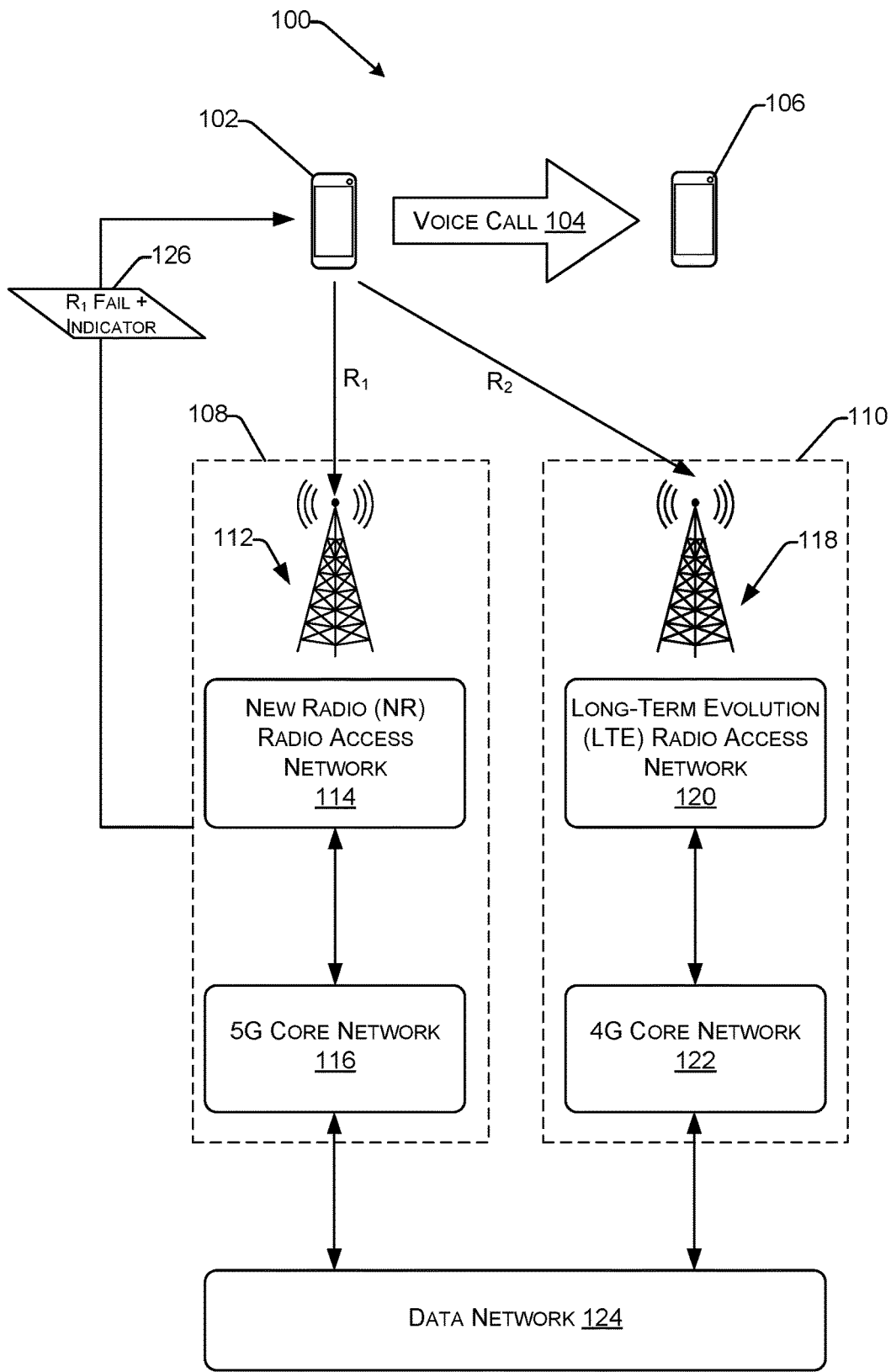
FIG. 1 illustrates an example environment for implementing a fallback mechanism for failed fifth generation (5G) communication set-up, as described herein.

Techniques described herein are directed to a fallback mechanism for managing voice over fifth generation (5G) communications. In an example, server computing device(s) associated with the 5G network can receive, from a mobile computing device, a request to initiate a voice call over the 5G network. The server computing device(s) can detect a failure to establish the voice call via the 5G network. That is, the server computing device(s) can detect a failure to successfully establish a requisite dedicated Quality of Service (QoS) flow (i.e., 5QI-1 flow) that enables data to be exchanged between the mobile computing device and the 5G network. Responsive to detecting the failure to establish the voice call over the 5G network, the server computing device(s) can send, to the mobile computing device, an indication that the voice call failed to be established via the 5G network. The indication can include an instruction to re-attempt to establish the voice call via a different network, such as the fourth generation (4G) network. As a result, the mobile computing device can re-attempt to establish the voice call via the different radio access technology thereby providing an improved user experience over what is available via current techniques. That is, instead of the voice call turning into a mute call and/or the voice call dropping, techniques described herein enable a fallback mechanism to extend a voice call to a second radio access technology (and hence, network) in an effort to ensure that the voice call is established and the user has a positive user experience.

As will be described herein, in some examples, the 5G network can use a timer to determine whether the voice call is established within a predetermined period of time. That is, if the QoS flow fails to be established within the predetermined period of time, the 5G network can determine that the voice call is not established via the 5G network and can send the indication, described above, to the mobile computing device. In additional or alternative examples, the 5G network can receive an explicit indication that the voice call is not going to be established via the 5G network and can send the indication to the mobile computing device based on receiving the explicit indication. Moreover, in at least some examples, the 5G network can determine whether the voice call is established within a predetermined number of attempts and, if the QoS flow fails to be established within the predetermined number of attempts, the 5G network can determine that the voice call is not established via the 5G network and can send the indication to the mobile computing device.

As described above, when the mobile computing device receives the indication, the mobile device can extend the effort to establish the voice call to another network. That is, even though the effort to establish a voice call via the 5G network fails (e.g., due to the inability to successfully establish the QoS flow), the initial invitation to establish a voice call has not failed. As such, the mobile computing device can re-attempt to establish the voice call via a different network. In some examples, the different network is the 4G network, which, because of propagation characteristics or because of different base station locations, may provide different coverage to mobile computing devices, thereby providing a fallback mechanism when the 5G effort is unsuccessful.

While techniques described herein are directed to a fallback mechanism for failed 5G voice calls, techniques described herein can be applicable to any sort of fallback mechanism for any type of technology. That is, in some examples, techniques described herein can be useful as a fallback mechanism for when a voice call over 4G, or any other technology, is unsuccessful. Furthermore, while techniques described herein are directed to a fallback mechanism for failed 5G voice calls, such techniques can be applicable to failures to establish the set-up for any type of data transmission and/or communication (e.g., video calls, etc.). That is, techniques described herein are not limited to voice calls and/or 5G technology.

Techniques described herein offer various improvements to existing technology. As described above, when the dedicated QoS flow for establishing voice calls via 5G cannot be established successfully, users experience mute-calls, dropped calls, etc., which cause poor user experiences. Techniques described herein improve existing technology such that even when a dedicated QoS flow cannot be established successfully, a mute-call does not result, a call is not dropped, and so on. That is, techniques described herein, enable a fallback mechanism to extend a voice call to a second radio access technology (and hence, network) in an effort to ensure that the voice call is established, and the user has a positive user experience. As such, techniques described herein offer improvements to existing technology. Additional or alternative improvements can be observed throughout the discussion of FIGS. 1-7 below.

FIG. 1 illustrates an example environment 100 for implementing a fallback mechanism for failed 5G communication set-up, as described herein. In FIG. 1, a mobile computing device 102 (which can additionally or alternatively be referred to as a "device") initiates a voice call 104 to another mobile computing device 106 (which can additionally or alternatively be referred to as a "device"). As described above, the voice call 104 can be any data transmission (e.g., a video call, etc.) and is not limited to a voice call.

There are two networks illustrated in FIG. 1, a 5G cellular network 108 (which can be referred to as the "5G network" herein) and a 4G cellular network 110 (which can be referred to as the "4G network" herein). Additional and/or alternative networks (e.g., second generation (2G) cellular network, third generation (3G) cellular network, Wi-Fi network, etc.) can be available to the mobile computing device 102 and the mobile computing device 106, despite not being pictured in FIG. 1. In at least one example, the 5G cellular network 108 can comprise one or more base stations 112 associated with new radio (NR) radio access technology that, via a NR radio access network 114, communicate with a 5G core network 116 (e.g., to create cell(s) in a 5G cellular network 108). That is, the 5G cellular network 108, as described herein, pertains to technology governed by the 3GPP NR standards (and thus, 5G, NR, and 5G/NR can be used interchangeably throughout to refer to the 5G network and associated radio access technology). The 4G network 110 can comprise one or more base stations 118 associated with Long-Term Evolution (LTE) radio access technology that, via a LTE radio access network 120, communicate with a 4G core network 122 (e.g., to create cell(s) in the 4G cellular network 110). That is, the 4G cellular network 110, as described herein, pertains to technology governed by the 3GPP LTE standards (and thus, 4G, LTE, and 4G/LTE can be used interchangeably throughout to refer to the 4G network and associated radio access technology). Both the 5G cellular network 108 and the 4G cellular network 110 can communicate with a data network 124, such as an Internet Protocol (IP) Multimedia Core Network Subsystem (IMS), to provide services to the mobile computing devices 102 and/or 106.

In some examples, the 5G cellular network 108 and the 4G cellular network 110 can be standalone networks. However, in some implementations the 5G cellular network 108 and the 4G cellular network 110 may be implemented as non-standalone networks, such as in Option 4 or 7, whereby the base station 112 and 118 may communicate directly and where the 4G core network 122 may be omitted.

In at least one example, the mobile computing device 102 sends a first request ($R_1$) to establish the voice call 104 via the 5G cellular network 108. Responsive to receiving the first request, the 5G cellular network 108 attempts to establish the voice call 104. That is, the 5G network attempts to set-up the media bearer to transmit data between the 5G cellular network 108 and the mobile computing device 102 via the dedicated QoS flow (i.e., 5QI-1 flow), as described above. Based at least in part on determining that the voice call 104 cannot be established (e.g., the set-up fails), the 5G core network 116 can send an indication 126 to the mobile computing device 102. In some examples, the indicator 126 can be a hex code or any other indicator to communicate to the mobile computing device 102 that can (i) indicate that the first request failed and (ii) include an instruction to re-attempt to establish the voice call 104 via a different network. For instance, the indicator 126 can be a packet server fallback cause code to effectuate the redirection to the alternate network. In at least one example, the indication 126 can further indicate that the voice call 104 is not going to continue to the different network via an automatic fallback mechanism (i.e., without receiving a second request from the mobile computing device 102). That is, the indication 126 can inform the mobile computing device 102 that the voice call 104 failed to be established via 5G and the 5G cellular network 108 is not going to take another action to redress the failure (and thus, that the mobile computing device 102 should re-attempt the voice call via another network).

The 5G cellular network 108 can utilize various mechanisms to determine that the voice call 104 cannot be established via the 5G cellular network 108. In at least one example, the 5G cellular network 108 can use a timer to determine whether the voice call 104 is established within a predetermined period of time. That is, if the QoS flow fails to be established within the predetermined period of time, the 5G cellular network 108 can determine that the voice call 104 is not established via the 5G cellular network 108 and can send the indication 126 to the mobile computing device 102. In additional or alternative examples, the 5G cellular network 108 can receive an explicit indication that the voice call 104 is not going to be established via the 5G cellular network 108 and can send the indication 126 to the mobile computing device 102 based on receiving the explicit indication. Moreover, in at least some examples, the 5G cellular network 108 can determine whether the voice call 104 is established within a predetermined number of attempts and, if the QoS flow fails to be established within the predetermined number of attempts, the 5G cellular network 108 can determine that the voice call is not established via the 5G network and can send the indication 126 to the mobile computing device 102.

As a result of receiving the indication 126, the mobile computing device 102 can re-attempt to establish the voice call 104 via a different network, thereby providing an improved user experience than what is available via current techniques. For instance, the mobile computing device 102 can send a second request ($R_2$) to a different network, which in FIG. 1 is illustrated as the 4G network 110, in an effort to establish the voice call 104. That is, instead of the voice call 104 turning into a mute call and/or the voice call dropping (due to the inability to establish the voice call 104 via the 5G cellular network 108), FIG. 1 illustrates a fallback mechanism to extend the voice call 104 from the first network (e.g., the 5G cellular network 108) to a second network (e.g., the 4G cellular network 110) in an effort to ensure that the voice call is established and the user has a positive user experience. If the 4G cellular network 110 is able to establish the voice call 104, the mobile computing device 102 can exchange voice data over the 4G cellular network 110 with the other mobile computing device 106. That is, the second request triggers the establishment of a bearer on LTE (e.g., QCI-1 flow) without complex logic, thereby enabling the mobile computing device 102 to exchange voice data via the 4G cellular network 110.

Figure 2:
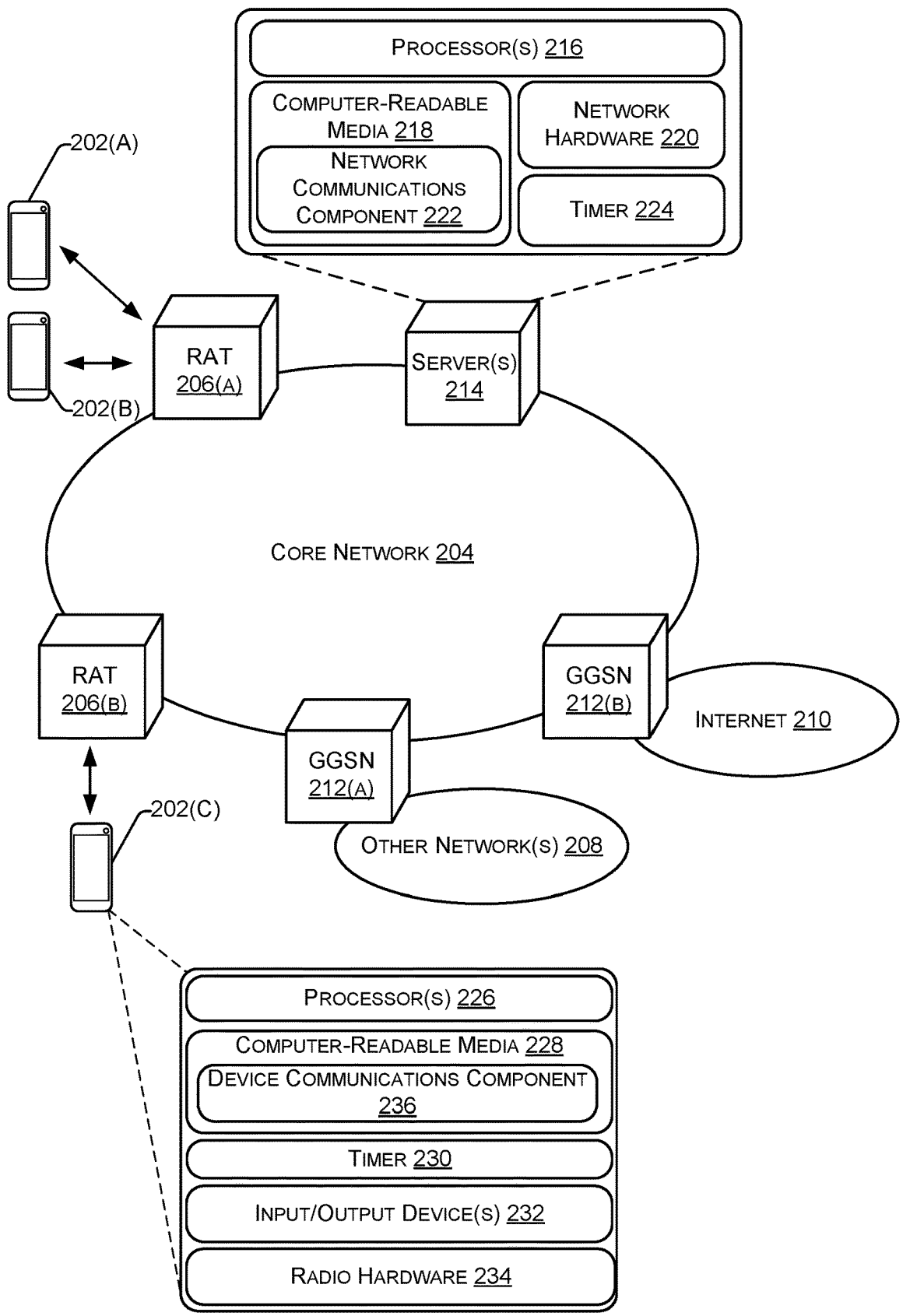
FIG. 2 illustrates an example system for implementing a fallback mechanism for failed 5G communication set-up, as described herein.

FIG. 2 illustrates an example system 200 for implementing a fallback mechanism for failed 5G communication set-up, as described herein. The system 200 includes a plurality of mobile computing devices 202(a), 202(b), and 202(c) (collectively 202), which can include mobile computing devices such as mobile computing device 102 and/or mobile computing device 106. While only three mobile computing devices are shown, any number of mobile computing devices 202 can be included in the system 200.

In at least one example, the mobile computing devices 202 can access a core network 204 via one or more radio access technologies (RATs) 206(a) and 206(b) (collectively 206). In at least one example, a RAT can include one or more components that enable a mobile computing device (e.g., 202(a)) to access the core network 204. For instance, a RAT can include a base station, such as base station 112 or base station 118, and a radio access network, such as NR radio access network 114 or LTE radio access network 120. That is, in at least one example, the core network 204 can be a 5G network which can be accessible by RATs 206 associated with 5G RAT (e.g., in a standalone configuration) or 5G RAT and 4G RAT (e.g., in a non-standalone configuration). Or, in at least one example, the core network 204 can be a 4G network which can be accessible by RATs 206 associated with 4G RAT (e.g., in a standalone configuration) or 4G and 5G RAT (e.g., in a non-standalone configuration). A base station (also known as a cell site or cell tower) can be associated with antennae and other electronic communications equipment (e.g., transceivers, digital signal processors, control electronics, a GPS receiver, etc.) to create a cell in a cellular network, such as the 5G cellular network 108 and/or the 4G cellular network 110. A radio access network is a network that enables the mobile computing devices 202 to connect to the core network 204.

In at least one example, the core network 204 connects different parts of the access network and also provides a gateway to other networks. For instance, the core network 204 can be responsible for routing communication to other networks 208, as well as routing data communication to external packet switched networks, such as the Internet 210. For example, the core network 204 may include one or more Gateway GPRS Support Nodes (GGSN) 212(a) and/or 212(b) (collectively 212) or another equivalent node to effectuate such routing.

The core network 204 can be associated with one or more server computing devices (e.g., server(s) 214). The server(s) 214 can be any type of server, such as a network-accessible server. In some examples, the server(s) 214 can be stand-alone computing systems, distributed-computing systems, networked-computing systems, etc. For instance, in at least one example, one or more of the functionalities described herein as being performed by the server(s) 214 can be performed by a single device or multiple devices. In some examples, one or more of the functionalities described herein can be performed by the mobile computing device(s) 202, RATs 206, etc. instead of, or in addition to, the server(s) 214.

In various examples, each of the server(s) 214 can be associated with one or more processors 216, computer-readable media 218, and network hardware 220.

The processor(s) 216 can represent, for example, a central processing unit (CPU)-type processing unit, a graphics processing unit (GPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 216 can execute one or more modules and/or processes to cause the server(s) 214 to perform a variety of functionalities, as set forth above and explained in further detail in the following disclosure. Additionally, each of the processor(s) 216 can possess its own local memory, which also can store program modules, program data, and/or one or more operating systems.

Depending on the exact configuration and type of the server(s) 214, the computer-readable media 218, can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disk read-only memory (CD-ROM), digital versatile discs (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. The computer-readable media 218 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the server(s) 214. Any such non-transitory computer-readable media can be part of the server(s) 214.

In contrast, communication media includes computer readable instructions, data structures, program modules, or other data in a modulated data signal, such as a carrier wave, or other transmission mechanism. As defined herein, computer storage media does not include communication media.

The computer-readable media 218 can include one or more components and/or data structures including, for example, a network communications component 222. The one or more components and/or data structures can be in the form of standalone applications, productivity applications, an operating system component, or any other application or software module configured to facilitate techniques described herein.

The network communications component 222 can be configured to perform operations as described below with reference to FIGS. 3-7. That is, in an example where the core network 204 is a 5G network, responsive to receiving a request to establish a voice call from a mobile computing device, such as the mobile computing device 202(c), the network communications component 222 attempts to establish the voice call. That is, the network communications component 222 receives a request to initiate a voice call and, in response, attempts to set-up the media bearer to transmit data between the 5G network and the mobile computing device 202(c) via the dedicated QoS flow, as described above. Based at least in part on determining that the voice call cannot be established (e.g., the set-up fails), the network communications component 222 can send an indication to the mobile computing device 202(c) indicating that the voice call was not established via the 5G network. In some examples, the indicator can be a hex code or any other indicator to communicate to the mobile computing device 202(c) that can (i) indicate that the first request failed and (ii) include an instruction to re-attempt to establish the voice call via a different network. For instance, the indicator can be a packet server fallback cause code to effectuate the redirection to the alternate network. In at least one example, the indication can further indicate that the voice call is not going to continue to the different network via an automatic fallback mechanism (i.e., without receiving a second request from the mobile computing device 102). That is, the indication can inform the mobile computing device 202(c) that the voice call failed to be established via 5G and the core network 204 is not going to take another action to redress the failure (and thus, that the mobile computing device 102 should re-attempt the voice call via another network).

In at least one example, the network communications component 222 can use a timer 224 to determine whether the voice call is established within a predetermined period of time. That is, if the QoS flow fails to be established within the predetermined period of time, the network communications component 222 can determine that the voice call is not established via the network communications component 222 and can send the indication to the mobile computing device 202(c). In additional or alternative examples, the network communications component 222 can receive an explicit indication that the voice call is not going to be established via the network communications component 222 and can send the indication to the mobile computing device 202(c) based on receiving the explicit indication. Moreover, in at least some examples, the network communications component 222 can determine whether the voice call is established within a predetermined number of attempts and, if the QoS flow fails to be established within the predetermined number of attempts, the network communications component 222 can determine that the voice call is not established via the 5G network and can send the indication to the mobile computing device 202(c).

The network hardware 220 can provide wired or wireless networking capabilities to the server(s) 214. The network hardware 220 can include or be incorporated into processors, ASICs, programmable circuits such as FPGAs, or in other ways.

In at least one example, the server(s) 214 can be associated with a timer 224, as described above, which can be used to track time. For instance, upon receiving a request to initiate a voice call, the timer 224 can begin to keep time (e.g., count down, count up, etc.) and, if the set-up for the voice call is not completed within a predetermined period of time, the network communications component 222 can send an indication, as described above. In an additional or alternative example, the timer 224 can be located on a RAT 206 or another location associated with the core network 204.

While a single core network 204 is depicted in FIG. 2, multiple core networks (e.g., 5G, 4G, 3G, 2G, etc.) may be available to the mobile computing devices 202, as described above. Furthermore, while the core network 204 is referred to as the 5G network, the 4G network can be similarly configured.

As described above, the mobile computing devices 202 can connect to the core network 204 via the RATs 206. In at least one example, the mobile computing device 202(c) (which can additionally or alternatively be referred to herein as "a device") can correspond to subscriber equipment (UE) including, but not limited to, a smart phone, a personal digital assistant, a netbook, a laptop computer, a smart appliance, and/or another electronic device that is capable of transmitting or receiving audio, video, and/or data via the core network 204. In at least one example, the mobile computing device 202(c) can include processor(s) 226, computer-readable media 228, a timer 230, input/output devices 232, and radio hardware 234.

The processor(s) 226 can have the same and/or similar structure and/or function as the processor(s) 216 described above. The computer-readable media 228 can have the same or similar structure and/or function as the computer-readable media 218 described above. The computer-readable media 228 can include one or more components and/or data structures including, for example, a device communications component 236. The one or more components and/or data structures can be in the form of standalone applications, productivity applications, an operating system component, or any other application or software module configured to facilitate techniques described herein.

The device communications component 236 can be configured to perform operations as described below with reference to FIGS. 4-7. That is, in at least one example, the device communications component 236 sends a first request to establish the voice call via the 5G network. In at least one example, if the voice call is not successfully established (e.g., the QoS flow fails, as described above), the device communications component 236 can receive an indication from the network communications component 222. As described above, the indication can (i) indicate that the attempt to establish a voice call via the 5G network failed and (ii) include an instruction to re-attempt to establish the voice call via a different network. As a result, the device communications component 236 can re-attempt to establish the voice call via the different network thereby providing an improved user experience than what is available via current techniques. For instance, the device communications component 236 can send a second request to a different network, such as the 4G network, in an effort to establish the voice call. That is, instead of the voice call turning into a mute call and/or the voice call dropping (due to the inability to establish the voice call via the 5G network), the core network 204 can implement a fallback mechanism to extend the voice call from the first network (e.g., the 5G cellular network 108) to a second network (e.g., the 4G cellular network 110) in an effort to ensure that the voice call is established and the user has a positive user experience. If the different network is able to establish the voice call, the mobile device 202(c) can exchange voice data over the different network with another mobile device.

In at least one example, the mobile computing device 202(c) can be associated with a timer 230, which can be used to track time. For instance, upon sending a request to initiate a voice call, the timer 230 can begin to keep time (e.g., count down, count up, etc.) and, if the set-up for the voice call is not completed within a predetermined period of time (e.g., the device communications component does not receive a response from the 5G cellular network 108 indicating that the voice call has been established), the device communications component 236 can notify the core network 204 that the voice call failed to be established (e.g., via the RAT 206(b)).

The input/output devices 232 can include a display, various user interface controls, audio speakers, cameras, connection ports and so forth.

The radio hardware 234 provides wireless UE capabilities, such as connecting to a base station associated with the core network 204. The radio hardware 234 can include or be incorporated into processors, ASICs, programmable circuits such as FPGAs, or in other ways. In at least one example, the radio hardware 234 can include radios associated with one or more of the RATs (e.g., 2G, 3G, 4G, 5G, etc.). As described above, the radio hardware 234 can enable the device 202(c) to connect to a base station associated with the core network 204. The device 202(c) can include additional or alternative hardware to enable the device to access additional or alternative network(s) 208 via additional or alternative RATs (e.g., BLUETOOTH®, WI-FI®, etc.).

The processes described below in association with FIGS. 3-7 can be implemented in hardware, software, or a combination thereof. The example processes are described in the context of the environments of FIGS. 1 and 2 but are not limited to those environments. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functionalities or implement particular abstract data types. In other embodiments, hardware components perform one or more of the operations. Such hardware components can include or be incorporated into processors, ASICs, programmable circuits such as FPGAs, or in other ways. The order in which the operations are described is not intended to be construed as a limitation, and any number of the described operations can be combined in any order and/or in parallel to implement the processes.

Figure 3:
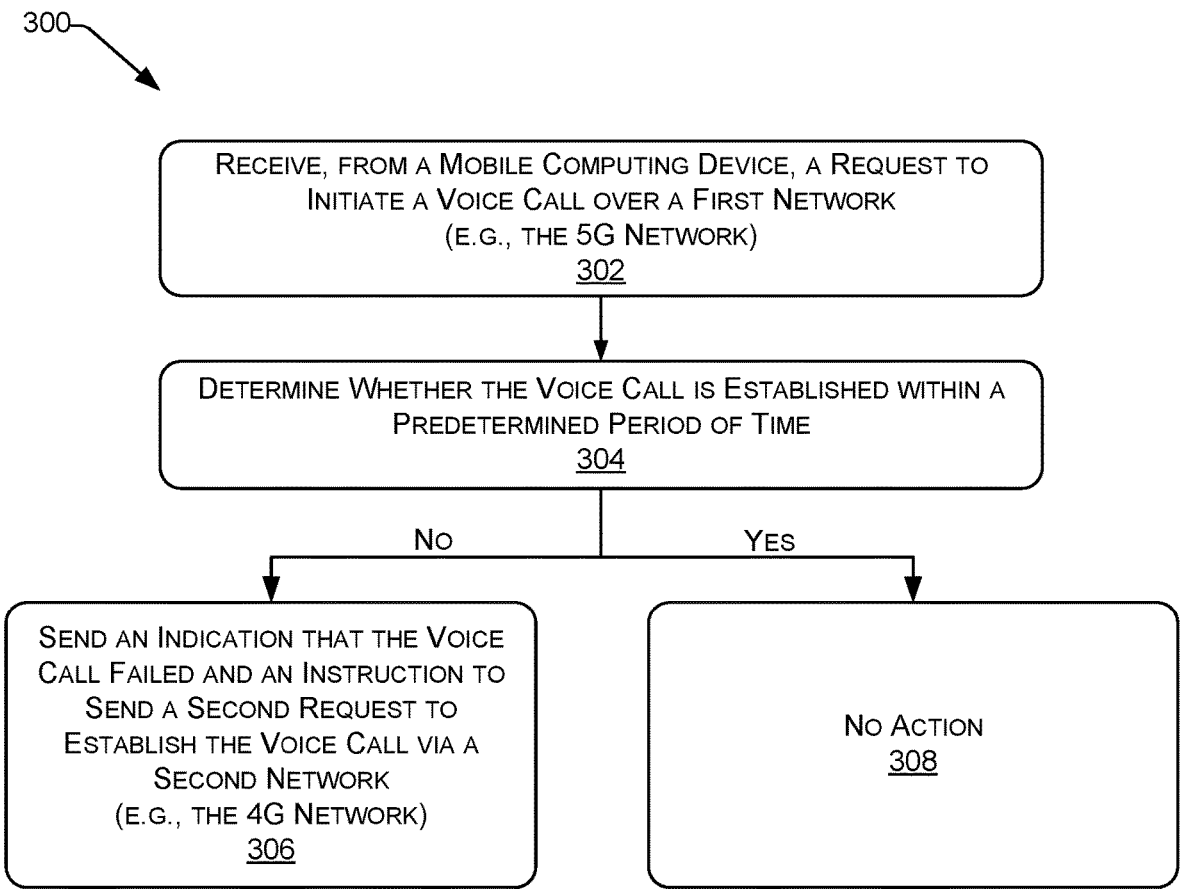
FIG. 3 illustrates an example process for implementing a fallback mechanism for failed 5G communication set-up from the perspective of one or more server computing devices, as described herein.

FIG. 3 illustrates an example process 300 for implementing a fallback mechanism for failed 5G communication set-up from the perspective of one or more server computing devices, as described herein.

Block 302 illustrates receiving, from a mobile computing device, a request to initiate a voice call over a first network (e.g., the 5G network). As described above, in at least one example, the device communications component 236 of the mobile computing device 202(c) sends a request to establish the voice call via the 5G network. The network communications component 222 can receive the request, for instance, via the RAT 206(b).

Block 304 illustrates determining whether the voice call is established within a predetermined period of time. In an example where the core network 204 is a 5G network, responsive to receiving a request to establish a voice call from a mobile computing device, such as the mobile computing device 202(c), the network communications component 222 attempts to establish the voice call. That is, the network communications component 222 receives a request to initiate a voice call and, in response, attempts to set-up the media bearer to transmit data between the 5G network and the mobile computing device 202(c) via the dedicated QoS flow, as described above. In at least one example, the network communications component 222 can utilize various mechanisms to determine whether the voice call is established (e.g., the media bearer is set-up via the dedicated QoS flow).

For instance, in at least one example, the network communications component 222 can use a timer 224 to determine whether the voice call is established within a predetermined period of time. That is, responsive to receiving the request to initiate the voice call over the first network, the timer 224 can begin to track time. And, if the QoS flow fails to be established within the predetermined period of time (as determined based on the timer 224), the network communications component 222 can determine that the voice call is not established via the network communications component 222 and can send the indication to the mobile computing device 202(c). In additional or alternative examples, the network communications component 222 can receive an explicit indication that the voice call is not going to be established via the network communications component 222 and can send the indication to the mobile computing device 202(c) based on receiving the explicit indication. Moreover, in at least some examples, the network communications component 222 can determine whether the voice call is established within a predetermined number of attempts and, if the QoS flow fails to be established within the predetermined number of attempts, the network communications component 222 can determine that the voice call is not established via the 5G network and can send the indication to the mobile computing device 202(c).

Block 306 illustrates sending an indication that the voice call failed and an instruction to re-attempt the voice call via a second network (e.g., the 4G network). Based at least in part on determining that the voice call cannot be established (e.g., the set-up fails), the network communications component 222 can send an indication to the mobile computing device 202(c) indicating that the voice call was not established via the 5G network. In some examples, the indicator can be a hex code or any other indicator to communicate to the mobile computing device 202(c) that can (i) indicate that the first request failed and (ii) include an instruction to re-attempt to establish the voice call via a different network. For instance, the indicator can be a packet server fallback cause code to effectuate the redirection to the alternate network. In at least one example, the indication can further indicate that the voice call is not going to continue to the different network via an automatic fallback mechanism (i.e., without receiving a second request from the mobile computing device 102). That is, the indication can inform the mobile computing device 202(*c*) that the voice call failed to be established via 5G and the core network 204 is not going to take another action to redress the failure (and thus, that the mobile computing device 102 should re-attempt the voice call via another network). Of course, based at least in part on determining that the voice call is established (e.g., the set-up is successful), the network communications component 222 can refrain from taking an action (other than to continue to facilitate the voice call between the mobile computing device 202(*c*) and its intended recipient), as block 308 recites.

Figure 4:
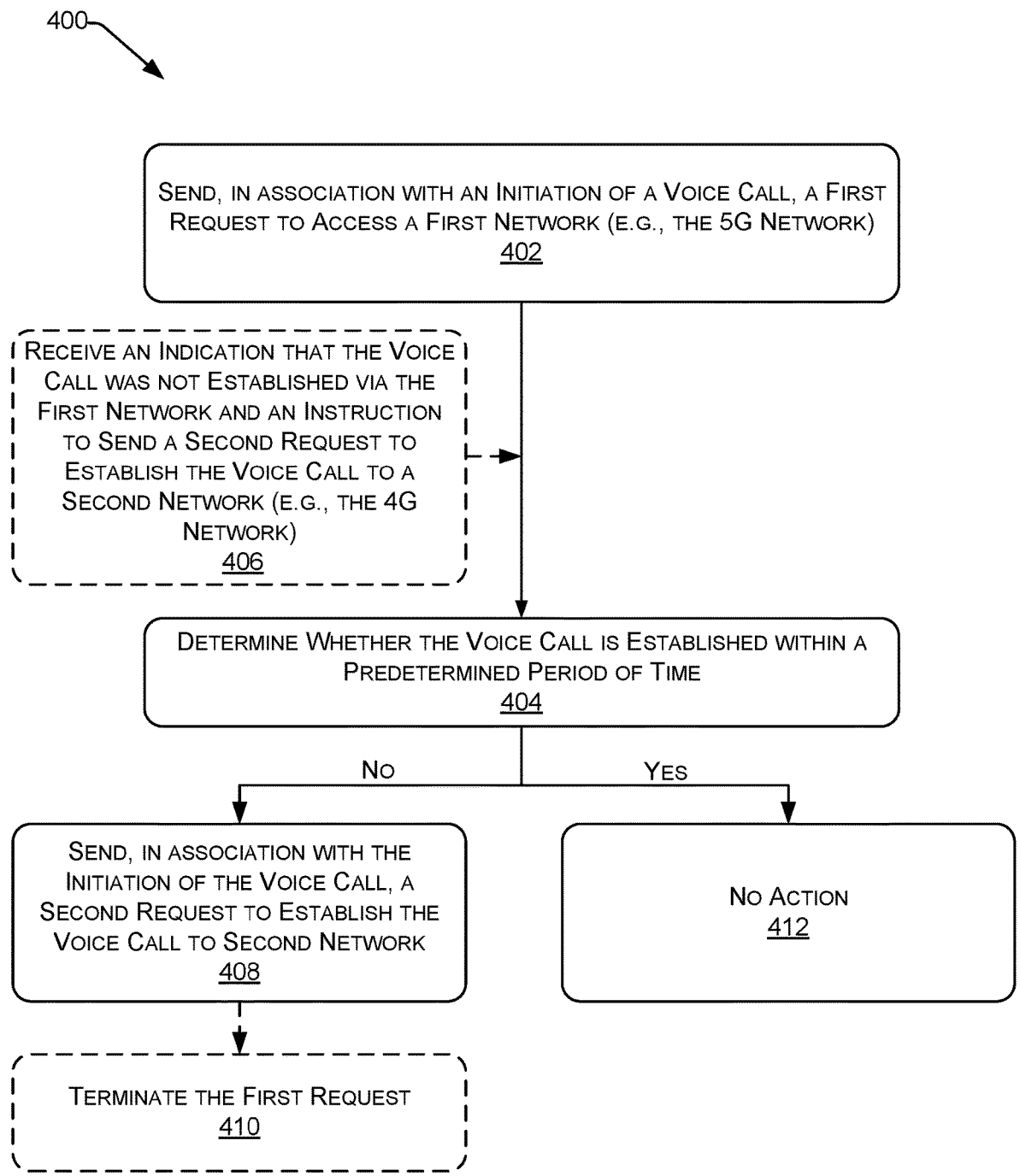
FIG. 4 illustrates an example process for implementing a fallback mechanism for failed 5G communication set-up from the perspective of a mobile computing device, as described herein.

FIG. 4 illustrates an example process 400 for implementing a fallback mechanism for failed 5G communication set-up from the perspective of a mobile computing device, as described herein.

Block 402 illustrates sending, in association with an initiation of a voice call, a first request to access a first network (e.g., the 5G network). In at least one example, the device communications component 236 associated with the mobile computing device 202(*c*), can send a first request to establish a voice call via the 5G network. In such an example, the mobile computing device 202(*c*) can transition from an idle 5G state to an active 5G state such that the 5G RAT is active for transmitting the first request.

Block 404 illustrates determining whether the voice call is established within a predetermined period of time. In at least one example, the device communications component 236 can determine whether the voice call is established within a predetermined period of time.

In some examples, the device communications component 236 can determine whether the voice call is established locally (i.e., without receiving an indication from the 5G network). In such an example, the mobile computing device 202(*c*) can be associated with a timer 230, which can be used to track time. For instance, upon sending the request to initiate a voice call, the timer 230 can begin to keep time (e.g., count down, count up, etc.) and, if the set-up for the voice call is not completed within a predetermined period of time (e.g., the device communications component does not receive a response from the 5G network indicating that the voice call has been established), the device communications component 236 can determine the voice call was not successfully established within the predetermined period of time. In at least one example, the device communications component 236 can notify the core network 204 that the voice call failed to be established (e.g., via the RAT 206(*b*)).

In additional or alternative examples, device communications component 236 can determine whether the voice call was established based on a communication from the 5G network. In such examples, the 5G network (e.g., the network communications component 222) can determine that the voice call was not established via the 5G network via mechanisms described above with reference to FIG. 3. For instance, block 406, which can be optional in some examples, illustrates receiving an indication that the voice call was not established via the first network and an instruction to send a second request to establish the voice call to a second network (e.g., the 4G network). In at least one example, if the voice call is not successfully established (e.g., the QoS flow fails, as described above), the device communications component 236 can receive an indication from the network communications component 222. As described above, the indication can (i) indicate that the attempt to establish a voice call via the 5G network failed and (ii) include an instruction to re-attempt to establish the voice call via a different network. Responsive to receiving such an indication, the device communications component 236 can determine the voice call was not successfully established within the predetermined period of time. Furthermore, in at least one example and responsive to receiving such an indication, the mobile computing device 202(*c*) can tune to the 4G RAT, receive MIB and SIBx, and thus transition to a 4G idle state.

Block 408 illustrates sending, in association with the initiation of the voice call, a second request to establish the voice call to the second network. Responsive to receiving the indication, the device communications component 236 can re-attempt to establish the voice call via the different network thereby providing an improved user experience than what is available via current techniques. For instance, the device communications component 236 can send a second request to a different network, such as the 4G network, in an effort to establish the voice call. In at least one example, the mobile computing device 202(*c*) can transition from the 4G idle state to a 4G active state to send the second request.

Accordingly, instead of the voice call turning into a mute call and/or the voice call dropping (due to the inability to establish the voice call via the 5G network), the core network 204 can implement a fallback mechanism to extend the voice call from the first network (e.g., the 5G cellular network 108) to a second network (e.g., the 4G cellular network 110) in an effort to ensure that the voice call is established and the user has a positive user experience. In some examples, the device communications component 236 can terminate (or put forth an effort to do so) the first request, as illustrated in block 410. In at least one example, the mobile computing device 202(*c*) can send a SIP error 580 notification to the 5G network in an effort to terminate the first request. As a result, the 5G network is able to free up its resources allocated to voice calls sooner than if the first request remains pending (despite being unsuccessful).

If the voice call is established within the predetermined period of time, the mobile computing device 202(*c*) can refrain from taking any action (other than participating in the voice call with the recipient of the voice call), as illustrated in block 412.

Figure 5:
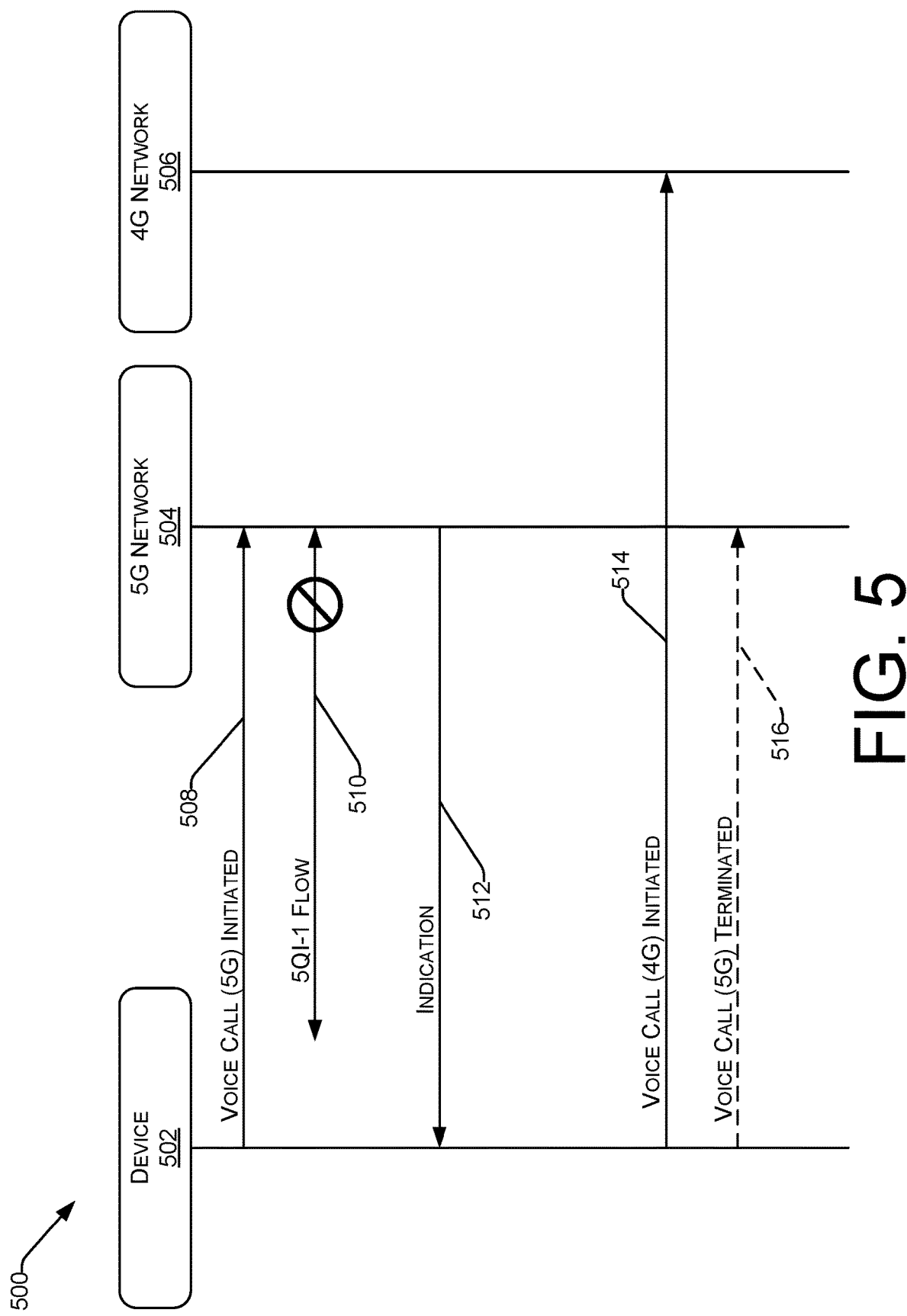
FIG. 5 illustrates an example process for a fallback mechanism for failed 5G communication set-up, wherein a mobile computing device is originating the 5G communication, as described herein.

FIG. 5 illustrates an example process 500 for a fallback mechanism for failed 5G communication set-up, wherein a mobile computing device is originating the 5G communication, as described herein. In FIG. 5, device 502 can correspond to mobile computing device 102 described above with reference to FIG. 1 and/or mobile computing device 202(*c*) described above with reference to FIG. 2. The 5G network 504 can correspond to the 5G cellular network 108 described above with reference to FIG. 1 and can include features of the system 200 described above with reference to FIG. 2. The 4G network 506 can correspond to the 4G cellular network 110 described above with reference to FIG. 1 and can include features of the system 200 described above with reference to FIG. 2.

In FIG. 5, the device 502 can send a first request to initiate a voice call over the 5G network, as represented by operation 508. The network communications component 222 can receive the request, for instance, via a RAT associated with the 5G network 504. In such an example, the mobile computing device 202(c) can transition from an idle 5G state to an active 5G state such that the 5G RAT is active for sending the first request.

Operation 510 illustrates the failure to establish the voice call via the 5G network 504. That is, the network communications component 222 receives a request to initiate a voice call and, in response, attempts to set-up the media bearer to transmit data between the 5G network 504 and the device 502 via the dedicated QoS flow (e.g., 5QI-1 flow.), as described above. In at least one example, the network communications component 222 can utilize various mechanisms to determine that the voice call is not established (e.g., the media bearer is not set-up via the dedicated QoS flow), as described above.

Based at least in part on determining that the voice call cannot be established (e.g., the set-up fails within the predetermined period of time, predetermined number of attempts, etc.), the network communications component 222 can send an indication, as illustrated by operation 512, to the device 502 indicating that the voice call was not established via the 5G network 504 and instructing the device 502 to re-attempt to establish the voice call via the 4G network 506. In at least one example, responsive to receiving the indication, the device 502 can tune to the 4G RAT, receive MIB and SIBx, and thus transition to a 4G idle state.

Responsive to receiving the indication the device communications component 236 can re-attempt to establish the voice call via the 4G network 506 thereby providing an improved user experience than what is available via current techniques. For instance, the device communications component 236 can send a second request to initiate the voice call, which is represented by operation 514, to the 4G network 506, in an effort to establish the voice call. In at least one example, the mobile computing device 202(c) can transition from the 4G idle state to a 4G active state to send the second request.

In some examples, the device communications component 236 can terminate (or put forth an effort to do so) the first request. In at least one example, the device 502 can send a notification (e.g., a SIP error 580), as illustrated by operation 516, to the 5G network 504 in an effort to terminate the first request. As a result, the 5G network 504 is able to free up its resources allocated to voice calls sooner than if the first request remains pending (despite being unsuccessful).

Figure 6:
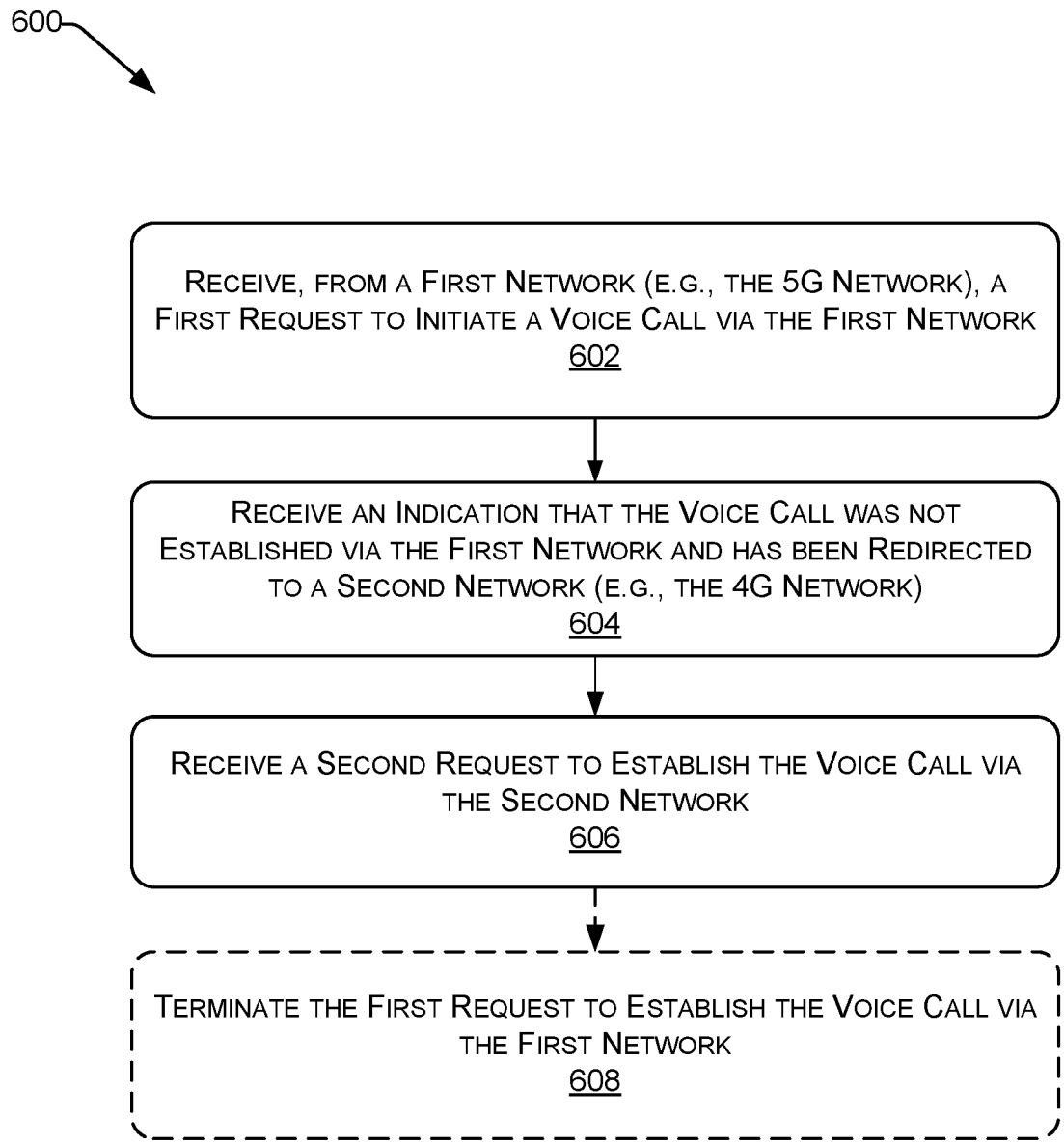
FIG. 6 illustrates another example process for implementing a fallback mechanism for failed 5G communication set-up from the perspective of a mobile computing device, as described herein.

FIG. 6 illustrates another example process 600 for implementing a fallback mechanism for failed 5G communication set-up from the perspective of a mobile computing device, as described herein.

Block 602 illustrates receiving, from a first network (e.g., the 5G network), a first request to initiate a voice call via the first network. In at least one example, an originating mobile computing device can send a first request to establish a voice call to the 5G network. The 5G network can forward the request to the mobile computing device 202(c). That is, the mobile computing device 202(c) can be the intended recipient of the voice call from the originating mobile computing device. In such an example, the mobile computing device 202(c) can transition from an idle 5G state to an active 5G state such that the 5G RAT is active responsive to receiving the first request to initiate the voice call via the first network.

Block 604 illustrates receiving an indication that the voice call was not established via the first network and has been redirected to a second network (e.g., the 4G network). In at least one example, if the voice call is not successfully established (e.g., the QoS flow fails, as described above), the device communications component 236 can receive an indication from the network communications component 222. As described above, the indication can (i) indicate that the attempt to establish a voice call via the 5G network failed and (ii) include an indication that the voice call has been redirected to the second network (e.g., the 4G network). In at least one example, responsive to receiving such an indication, the mobile computing device 202(c) can tune to the 4G RAT, receive MIB and SIBx, and thus transition to a 4G idle state.

Further, responsive to receiving such an indication, the device communications component 236 can receive a second request to establish the voice call via the second network, as illustrated in block 606. In at least one example, the mobile computing device 202(c) can transition from the 4G idle state to a 4G active state responsive to receiving the second request.

In some examples, the device communications component 236 can terminate (or put forth an effort to do so) the first request, as illustrated in block 608. In at least one example, the mobile computing device 202(c) can send a SIP error 580 notification to the 5G network in an effort to terminate the first request. As a result, the 5G network is able to free up its resources allocated to voice calls sooner than if the first request remains pending (despite being unsuccessful).

FIG. 7 illustrates an example process 700 for a fallback mechanism for failed 5G communication set-up, wherein a mobile computing device is not originating the 5G communication, as described herein. In FIG. 7, device 702 can correspond to mobile computing device 102 described above with reference to FIG. 1 and/or mobile computing device 202(c) described above with reference to FIG. 2. The 5G network 704 can correspond to the 5G cellular network 108 described above with reference to FIG. 1 and can include features of the system 200 described above with reference to FIG. 2. The 4G network 706 can correspond to the 4G cellular network 110 described above with reference to FIG. 1 and can include features of the system 200 described above with reference to FIG. 2.

In FIG. 7, the device 702 can receive, from an originating device, a first request to initiate a voice call over the 5G network 704, as represented by operation 708. That is, the mobile computing device 202(c) can be the intended recipient of the voice call from the originating mobile computing device. In at least one example, the device communications component 236 can receive the request, for instance, via a RAT associated with the 5G network 704. In such an example, the mobile computing device 202(c) can transition from an idle 5G state to an active 5G state such that the 5G RAT is active responsive to receiving the first request to initiate the voice call via the 5G network.

Operation 710 illustrates the failure to establish the voice call via the 5G network 704. That is, the network communications component 222 receives a request to initiate a voice call and, in response, attempts to set-up the media bearer to transmit data between the 5G network and the device 702 via the dedicated QoS flow (e.g., 5QI-1 flow.), as described above. In at least one example, the network communications component 222 can utilize various mechanisms to determine that the voice call is not established (e.g., the media bearer is not set-up via the dedicated QoS flow), as described above.

Based at least in part on determining that the voice call cannot be established (e.g., the set-up fails), the network communications component 222 can send an indication, as illustrated in operation 712, to the device 702 indicating that the voice call was not established via the 5G network 704 and indicating that the voice call has been redirected to a second network (e.g., the 4G network 706). In at least one example, responsive to receiving such an indication, the mobile computing device 202(*c*) can tune to the 4G RAT, receive MIB and SIBx, and thus transition to a 4G idle state.

The network communications component 222 can send a second request (received from the originating mobile device) to initiate the voice call, as illustrated by operation 714, to the device 702, in an effort to establish the voice call via the 4G network 706. In at least one example, the mobile computing device 202(*c*) can transition from the 4G idle state to a 4G active state responsive to receiving the second request.

In some examples, the device communications component 236 can terminate (or put forth an effort to do so) the first request. In at least one example, the device 702 can send a notification, as illustrated in operation 716, to the 5G network 704 in an effort to terminate the first request. As a result, the 5G network is able to free up its resources allocated to voice calls sooner than if the first request remains pending (despite being unsuccessful).

While techniques described in FIGS. 1-7 are directed to a fallback mechanism for failed 5G voice calls, techniques described herein can be applicable to any sort of fallback mechanism for any type of technology. That is, in some examples, techniques described herein can be useful as a fallback mechanism for when a voice call over 4G, or any other technology, is unsuccessful. Furthermore, while techniques described herein are directed to a fallback mechanism for failed 5G voice calls, such techniques can be applicable to failures to establish the set-up for any type of data transmission and/or communication (e.g., video calls, etc.). That is, techniques described herein are not limited to voice calls or 5G technology.

As described above, techniques described herein offer various improvements to existing technology. Techniques described herein improve existing technology such that even when a dedicated QoS flow cannot be established successfully, a mute-call does not result, a call is not dropped, and so on. That is, techniques described herein, enable a fallback mechanism to extend a voice call to a second radio access technology (and hence, network) in an effort to ensure that the voice call is established, and the user has a positive user experience. As such, techniques described herein offer improvements to existing technology.

Although the subject matter has been described in language specific to structural data items and/or methodological acts, it is to be understood that the subject matter defined in the appended claims is not necessarily limited to the specific data items or acts described. Rather, the specific data items and acts are disclosed as example forms of implementing the claims.

What is claimed is:

1. A method, implemented at least in part by one or more server computing devices of a fifth generation (5G) core network of a 5G network, the method comprising:
   receiving, from a mobile computing device, a first request to initiate a voice call over the 5G network;
   detecting a failure to establish a Quality-of-Service (QoS) flow for the voice call via the 5G network; and
   sending, to the mobile computing device and responsive to detecting the failure to establish the QoS flow, an indication that the voice call failed to be established via the 5G network, wherein the indication includes an instruction to re-attempt to establish the voice call via a different network, and wherein the instruction causes the mobile computing device to submit a second request to establish the voice call to the different network.

2. The method as claim 1 recites, wherein detecting the failure to establish the QoS flow via the 5G network comprises determining, based at least in part on a timer associated with the 5G network, that the QoS flow is not established within a predetermined period of time.

3. The method as claim 1 recites, wherein detecting the failure to establish the QoS flow via the 5G network comprises receiving an explicit response that the QoS flow over the 5G network cannot be established.

4. The method as claim 1 recites, wherein detecting the failure to establish the QoS flow via the 5G network comprises determining, after a predetermined number of attempts, that the QoS flow is not established.

5. The method as claim 1 recites, wherein the different network comprises a fourth generation (4G) Long-Term Evolution (LTE) network.

6. The method as claim 1 recites, wherein the indication further indicates that the voice call is not going to continue to the different network via an automatic fallback mechanism performed by the 5G network.

7. A system comprising:
   one or more processors;
   computer-readable media storing instructions, that when executed by the one or more processors, cause the one or more processors to perform acts comprising:
      receiving, from a mobile computing device, a first request to initiate a voice call over a fifth generation (5G) network;
      detecting a failure to establish the voice call via the 5G network; and
      sending, to the mobile computing device and responsive to detecting the failure to establish the voice call via the 5G network, an indication that the voice call failed, wherein the indication includes an instruction to re-attempt to establish the voice call via a different network, and wherein the instruction causes the mobile computing device to send a second request to establish the voice call to the different network, wherein the indication further indicates that the voice call is not to continue to the different network via an automatic fallback mechanism performed by the 5G network.

8. The system as claim 7 recites, wherein detecting the failure to establish the voice call via the 5G network comprises determining, based at least in part on a timer associated with the 5G network, that the voice call is not established within a predetermined period of time.

9. The system as claim 7 recites, wherein detecting the failure to establish the voice call via the 5G network comprises receiving an explicit response that the voice call over the 5G network cannot be established.

10. The system as claim 7 recites, wherein detecting the failure to establish the voice call via the 5G network comprises determining, after a predetermined number of attempts, that the voice call is not established.

11. The system as claim 7 recites, wherein the different network comprises a fourth generation (4G) Long-Term Evolution (LTE) network.

12. A device comprising:
   one or more processors; and
   computer-readable media storing instructions, that when executed by the one or more processors, cause the one or more processors to perform acts comprising:

sending, in association with an initiation of a voice call, a first request to establish the voice call via a standalone fifth generation (5G) network;

determining a failure to establish the voice call via the 5G network; and sending, in association with the initiation of the voice call and responsive to determining the failure to establish the voice call via the 5G network, a second request to establish the voice call via a different standalone network, wherein the indication further indicates that the voice call is not going to continue to the different standalone network via an automatic fallback mechanism performed by the 5G network.

13. The device as claim 12 recites, the acts further comprising:

determining, based at least in part on a timer associated with the device, that the voice call is not established within a predetermined period of time; and determining the failure to establish the voice call via the 5G network based at least in part on determining that the voice call is not established within the predetermined period of time.

14. The device as claim 12 recites, the acts further comprising:

receiving an indication that the voice call was not established via the 5G network due to a timeout; and determining the failure to establish the voice call via the 5G network based at least in part on receiving the indication.

15. The device as claim 14 recites, wherein the indication includes an instruction to re-attempt to establish the voice call via the different standalone network.

16. The device as claim 15 recites, wherein sending the second request to access the different standalone network is responsive to receiving the indication with the instruction to re-attempt to establish the voice call via the different standalone network.

17. The device as claim 12 recites, the acts further comprising terminating the first request to establish the voice call via the 5G network at a substantially same time as sending the second request to establish the voice call via the different standalone network.

18. The device as claim 12 recites, wherein the different standalone network comprises a fourth generation (4G) Long-Term Evolution (LTE) network.

* * * * *